Figure 1:
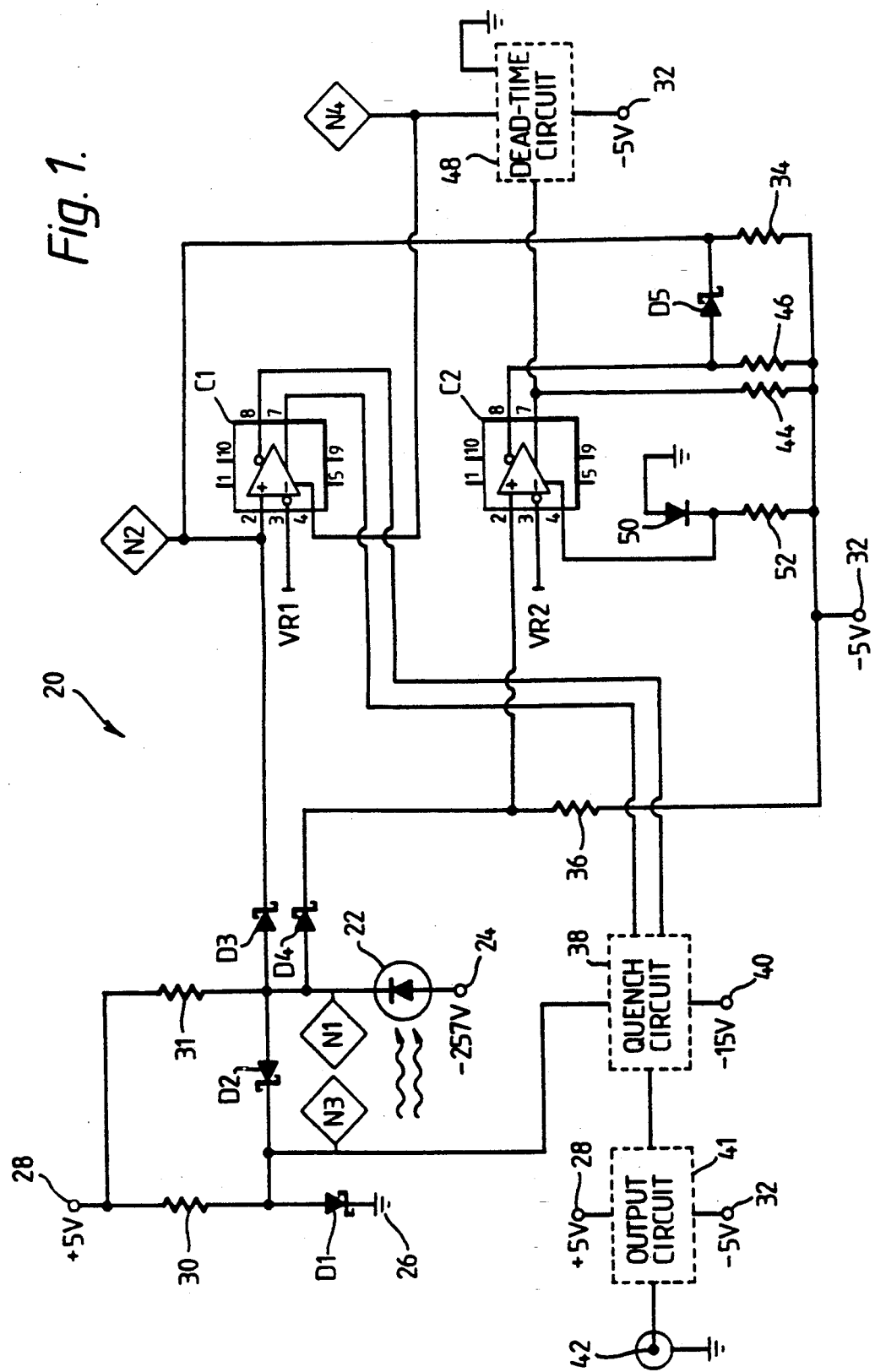

United States Patent [19]
Johnson et al.

[11] Patent Number: 5,194,727
[45] Date of Patent: Mar. 16, 1993

[54] AVALANCHE PHOTODIODE QUENCHING CIRCUIT WTIH RESETTING MEANS HAVING A SECOND AMPLIFIER

[75] Inventors: Martin Johnson; Robin Jones, both of Worcs, England

[73] Assignee: The Secretary of State for Defence in Her Britannic Majesty's Government of the United Kingdom of Great Britain and Northern Ireland, London, England

[21] Appl. No.: 834,287

[22] PCT Filed: Jul. 2, 1990

[86] PCT No.: PCT/GB90/01012
§ 371 Date: Feb. 20, 1992
§ 102(e) Date: Feb. 20, 1992

[87] PCT Pub. No.: WO91/00502
PCT Pub. Date: Jan. 10, 1991

[30] Foreign Application Priority Data
Jul. 3, 1989 [GB] United Kingdom ............ 8915245

[51] Int. Cl.⁵ .................................. H01J 40/14
[52] U.S. Cl. ......................... 250/214 R; 307/311
[58] Field of Search ............ 250/214 R; 307/311; 357/30 A

[56] References Cited
U.S. PATENT DOCUMENTS 4,754,131 6/1988 Bethea et al. .......... 250/214 R
4,945,227 7/1990 Jones et al. ............ 250/214 R
4,963,727 10/1990 Cova .................... 250/214 R
5,130,526 7/1992 Mischel et al. .......... 250/214 R

FOREIGN PATENT DOCUMENTS 0365095 6/1990 European Pat. Off. .
WO/04034 4/1988 PCT Int'l Appl. .

OTHER PUBLICATIONS

Applied Optics, vol. 26, No. 12, Jun. 15, 1987, New York, U.S., R G. W. Brown et al, "Characterization of Silicon Avalanche Photodiodes for Photon (con't) Correlation Measurements. 2: Active Quenching", pp. 2383-2389.

Primary Examiner—David C. Nelms
Assistant Examiner—T. Davenport
Attorney, Agent, or Firm—Nixon & Vanderhye

[57] ABSTRACT

An avalanche photodiode quenching circuit (20) incorporates an avalanche photodiode (APD) (22) and a first comparator (C1) responsive to reduction in APD voltage. The comparator (C1) is arranged to activate an APD quench circuit (38) in response to APD avalanche initiation. The circuit (20) also includes a second comparator (C2) arranged to reset the first comparator input (N2) in response to a further reduction in APD voltage caused by initiation of quenching. The second comparator (C2) is also connected to a monostable circuit (48) arranged to latch the first comparator output response to resetting. The monostable circuit (48) maintains the first comparator output level constant until the APD (22) has recharged.

5 Claims, 5 Drawing Sheets

AVALANCHE PHOTODIODE QUENCHING CIRCUIT WTIH RESETTING MEANS HAVING A SECOND AMPLIFIER

This invention relates to an avalanche photodiode quenching circuit for use in photon counting measurements.

Photon counting measurements were originally, and are to some extent presently, carried out using photomultiplier tubes for photon detection. A typical photomultiplier is however relatively fragile, bulky and expensive. The search for a more convenient alternative has led to the use of photodiodes operated in the so-called avalanche Geiger mode. This mode entails reverse-biasing the photodiode with a bias voltage typically a few volts greater than the photodiode breakdown voltage $V_{BR}$. $V_{BR}$ is the voltage at which a single photon absorption produces complete electrical breakdown of the photodiode active region by cascaded collision ionisation. It is analogous to the ionisation processes occurring in the gas phase in a Geiger-Muller tube.

Avalanche photodiodes are comparatively inexpensive and rugged, and exhibit high quantum efficiencies. They are not however without disadvantages. In particular, for the purposes of achieving high quantum efficiencies, it is necessary to operate at reverse voltages at least bordering on that capable of producing a self-sustaining avalanche in the photodiode. If the photodiode avalanche current reaches a value referred to as $I_{latch}$, typically 50 microamps, the avalanche is self-sustaining in the absence of further photons. This may produce catastrophic failure. The photodiode is substantially insensitive to photons while in the avalanche condition. Furthermore, it experiences temperature stress which, after the avalanche is terminated by removing the bias voltage, manifests itself as an increased dark current in subsequent operation. This reduces measurement accuracy and sensitivity, since dark current counts must be subtracted from the total count in a measurement, and both are subject to Poissonian statistics. Furthermore, a sustained current through the photodiode in excess of $I_{latch}$ tends to fill normally empty defect sites or traps in the photodiode semiconductor material. These traps have long lifetimes compared to the minimum time between counts or dead-time of the photodiode. Trapped charge carriers are therefore released considerably later than, but are correlated with, a photon absorption responsible for the avalanche creating them. The release produces so-called after pulses which are detected by the measuring circuitry monitoring the photodiode. This is a serious problem in the field of photon correlation spectroscopy in particular, since it means that the detection system introduces a degree of correlation between detected pulses which is absent in the original light beam. The measured autocorrelation function will therefore exhibit spurious features which affect or even invalidate the measurement results.

To circumvent these difficulties, the approach in the art has been to provide means for quenching an avalanche as soon as possible after initiation and detection. One particularly simple approach is referred to as passive quenching. It involves arranging the photodiode in series with a comparatively large series resistor, e.g. 220 Kohm, and applying the bias voltage across the series arrangement. Prior to photon absorption, i.e. when the photodiode is quiescent, the bias appears across the substantially non-conducting photodiode. After absorption, the resistor limits the maximum current taken by the photodiode to a value below $I_{latch}$ when the falling voltage across the photodiode becomes equal to $V_{BR}$. The avalanche is therefore automatically terminated. This arrangement is adequate for comparatively low photodetection rates up to 250 KHz and light intensity fluctuation frequencies up to the same value. However, its disadvantage is that the photodiode is comparatively slow to recover from a detection event. The photodiode must recharge its capacitance through the large resistance before it returns to the quiescent or photosensitive state and this leads to a dead-time in the order of 1 $\mu$sec. Furthermore, during recharge, the photodiode has a variable and increasing sensitivity. Consequently, dead-time is ill-defined and dead-time correction is inaccurate.

Dead-time limitations render the passively quenched avalanche photodiode suitable for photon correlation laser anemometry and spectroscopy experiments where the photon correlator sample time or delay is greater than a few microseconds. However, light intensity fluctuation frequencies greater than 1 MHz regularly occur in photon correlation measurements on particle diameters of a few tens of nanometers, and also in transonic and supersonic fluid flow measurements by laser Doppler anemometry. A passively quenched avalanche photodiode is not capable of detecting such frequencies.

An IEEE Transactions on Nuclear Science, Vol NS-29, No 1, February 1982 (Reference 1), Cova et al describe active quenching circuits for an avalanche photodiode. In this technique, an avalanche is detected very quickly after initiation. A feedback circuit responds by applying a quenching pulse to the photodiode, taking its reverse bias voltage below breakdown and quenching the avalanche. After quenching, a reset pulse is applied to the photodiode to restore its reverse voltage to the original above-breakdown value. The photodiode is accordingly both actively quenched and actively reset. This produces a very short dead-time in the order of a few tens of nanoseconds. However, in practice, this technique possesses disadvantages. The photodiode has a reverse voltage of about 4 V in excess of its breakdown voltage $V_{BR}$, and it is required to detect an avalanche as soon as possible after this voltage has begun to fall. It is necessary for the quenching circuit to respond to a fall of a few tens of millivolts. Moreover, the reset pulse is required to re-establish the original photodiode reverse voltage very accurately without re-triggering the feedback circuit and generating a spurious count. In practice this is difficult to achieve. Furthermore, the circuits are characterised by an ill-defined dead-time. Photon absorption events which are too close together in time produce a situation in which a counter has not fully recovered from a first pulse before it receives a second, and the second is not detected. This results in discrimination against recordal of second pulses; it is known as the "odd-even" effect, since for example a first or odd-numbered pulse is more likely to be counted than a second or even-numbered pulse. In a typical photon correlator, this will introduce spurious correlation effects distorting the measured correlation function.

A further quenching circuit for an avalanche photodiode is described in International Application No WO 88/04034 published under the Patent Co-operation Treaty on Jun. 2, 1988. It provides for active quenching of a photodiode current avalanche, but the photodiode is subsequently isolated to allow recharge through a low value ballast resistor. This combines active quenching with passive reset, the reset operation being rapid by virtue of the low value (1 Kohm) of the ballast resistor. Initiation of an avalanche is sensed by a comparator, which responds rapidly by reducing the photodiode voltage below breakdown via a quench circuit. This also isolates the photodiode from the comparator. The comparator input is then reset to its original level, and the consequent change in comparator output terminates the quench operation allowing the photodiode to recharge. The change in comparator output also terminates the reset operation, by which time the photodiode has recharged. The recharge rate is much more rapid than in earlier passive quench-passive reset arrangements. This circuit provides an accurately defined dead-time in the region of 50 nanoseconds, substantially constant output pulse width, reliable quenching and high speed operation. In principle it can operate at photon counting rates up to 20 MHz, and provides good protection against after pulsing and the odd-even effect previously referred to.

Despite the advantages exhibited by the device of International Application No WO 88/04034, unfortunately it is unsuitable for operation at photon counting rates above 20 MHz. This region is of interest for photon correlation measurements of very small particle diameters and very high speed fluid flow measurements by laser Doppler anemometry. There is therefore a need for a quenching circuit capable of higher speed operation.

It is an object of the invention to provide an alternative form of avalanche photodiode quenching circuit.

The present invention provides an avalanche photodiode quenching circuit including an avalanche photodiode rechargeable through a ballast resistor, an avalanche detection amplifier having an input connected to receive a signal from the photodiode and arranged to respond to a photodiode avalanche by activating quenching means, resetting means arranged to reset the amplifier subsequent to avalanche detection, and means for introducing a circuit dead-time, characterised in that the resetting means includes a second amplifier arranged to respond to photodiode bias voltage reduction caused by initiation of quenching.

The invention provides the advantage of reliable quench and reset combined with capability for increased speed of operation as compared to the prior art when components of equivalent performance are employed. One embodiment of the invention has proved capable of counting rates of 40 MHz, twice the speed of comparable prior art devices.

The means for introducing a circuit dead-time preferably comprises a monostable circuit triggerable by change in the second amplifier output and arranged to cause latching of the output response of the first amplifier to the resetting means. This provides well-defined dead-time. The quenching means conveniently comprises a differential amplifier operative to reduce avalanche photodiode potential drop in response to activation by the first amplifier.

Figure 2:
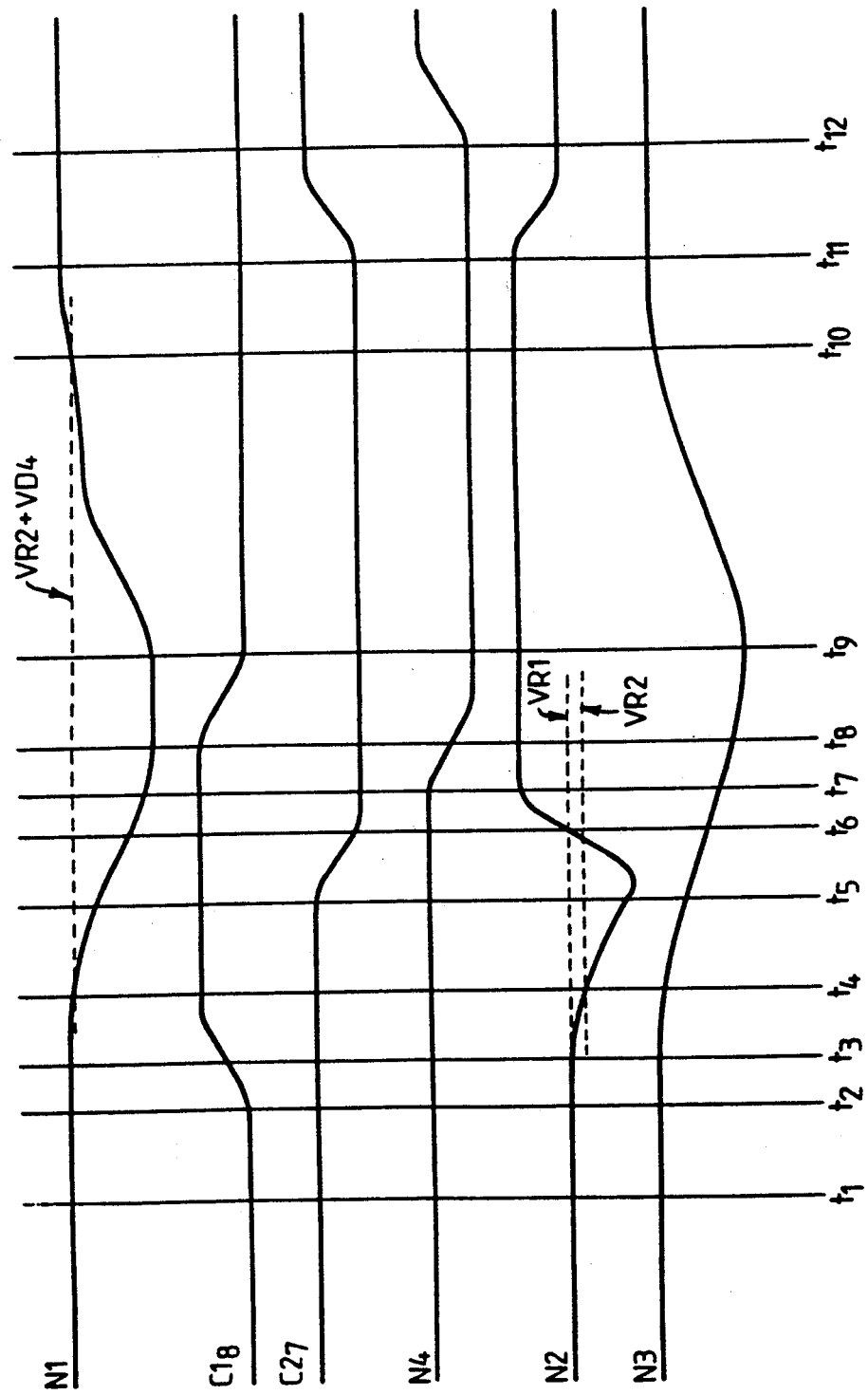
Figure 3:
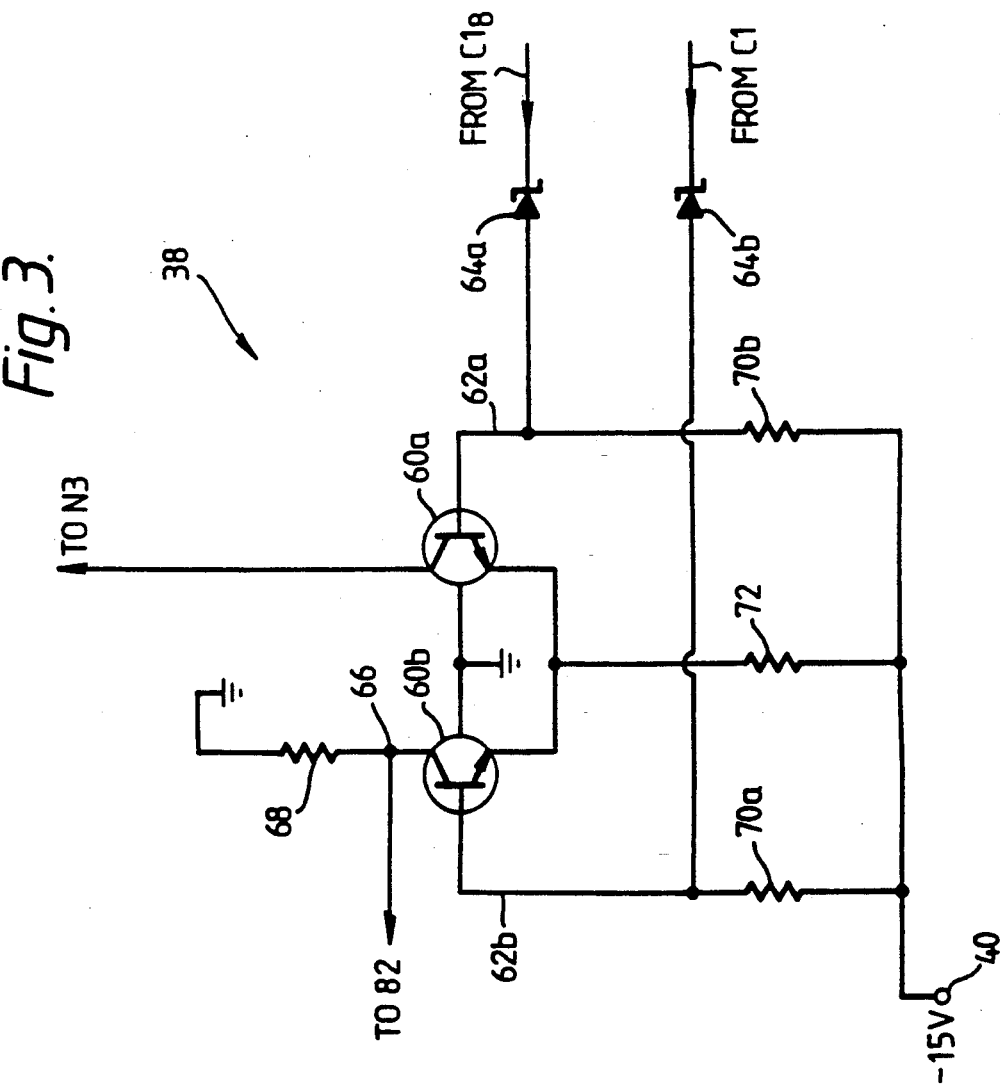
Figure 4:
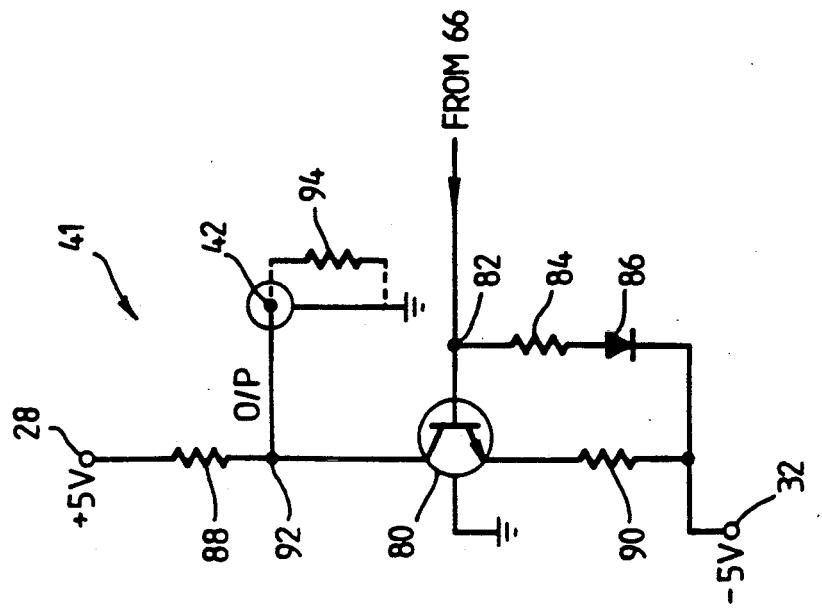
Figure 5:
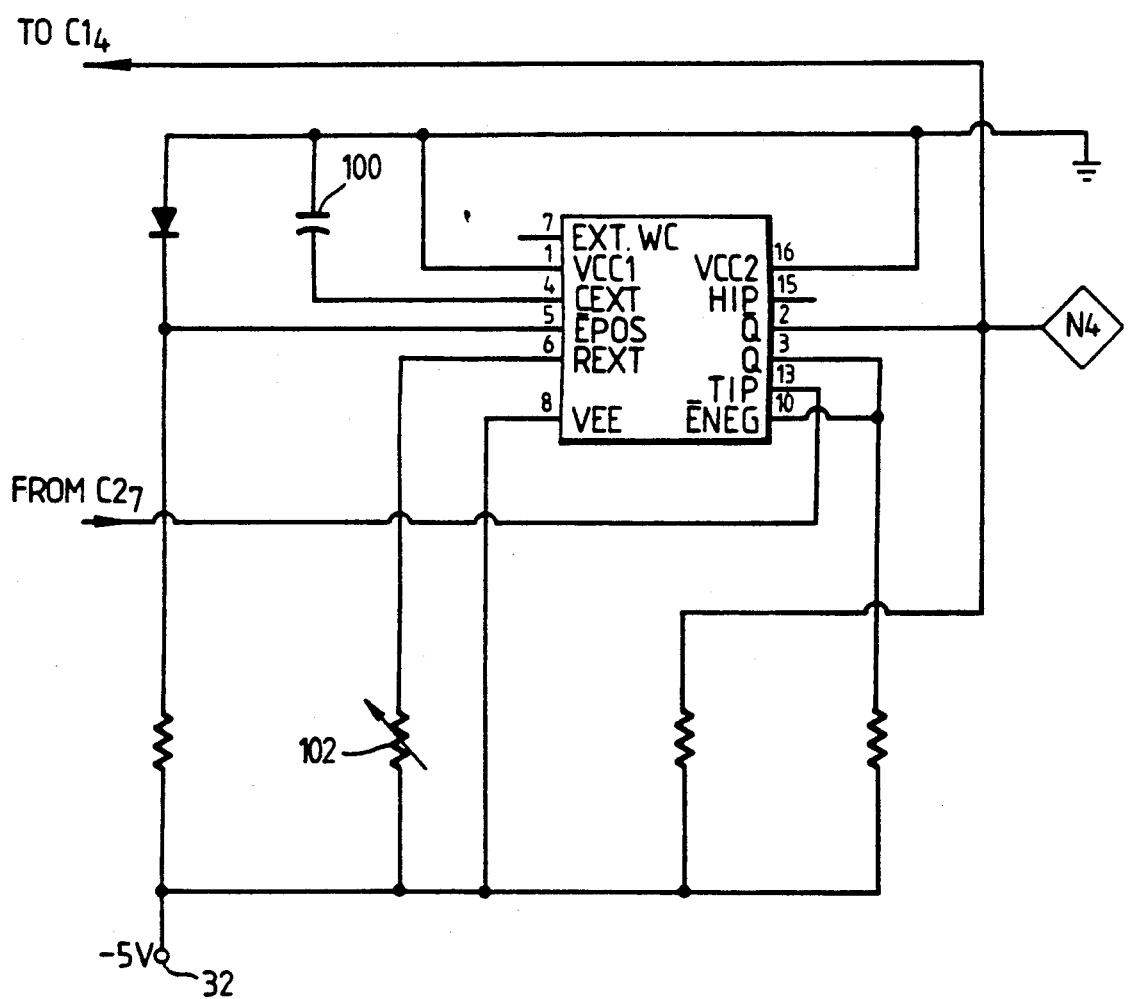
Figure 6:
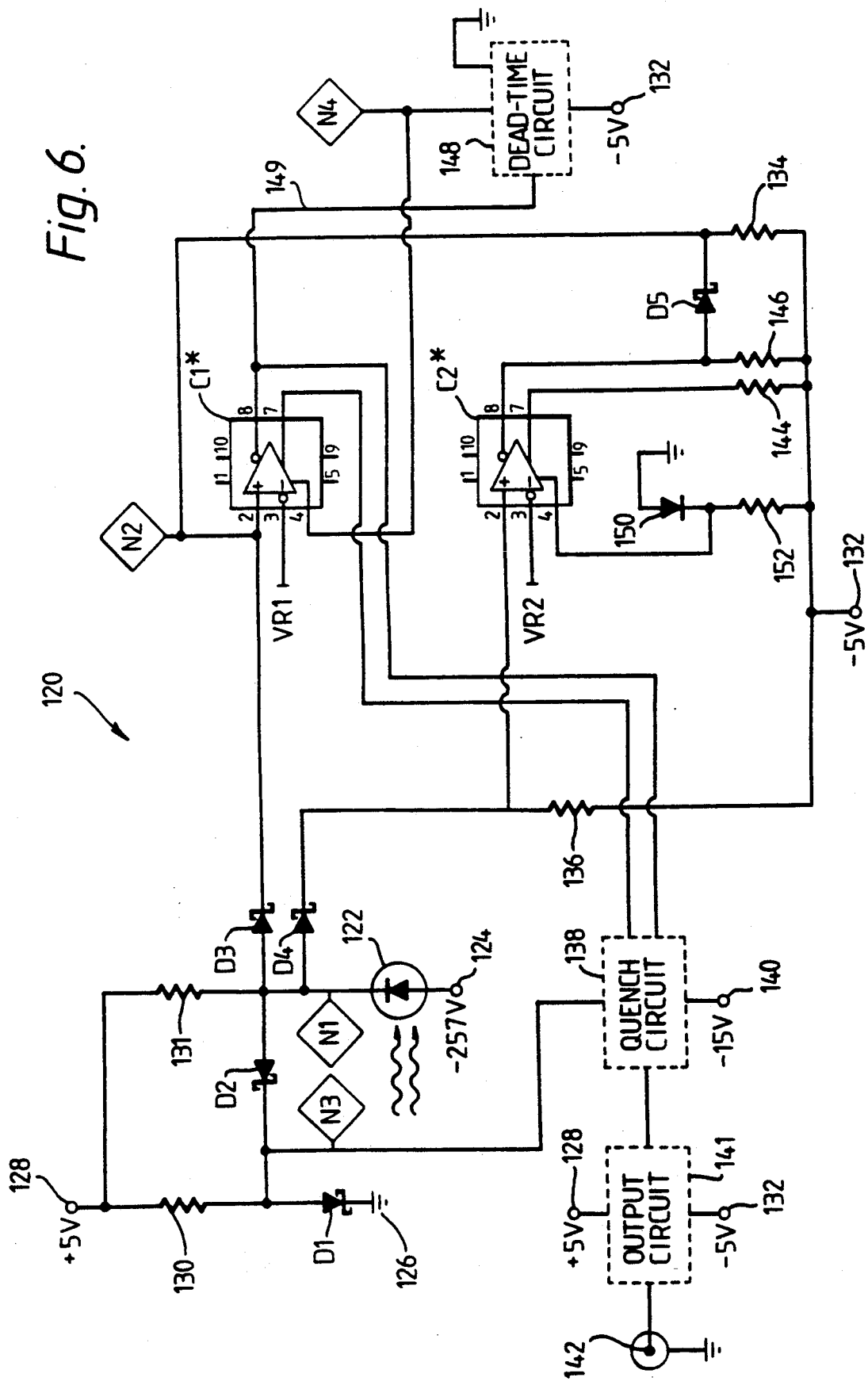

In order that the invention might be more fully understood, an embodiment thereof will now be described, with reference to the accompanying drawings, in which:

FIG. 1 is a schematic drawing of an avalanche photodiode quenching circuit of the invention, FIG. 2 provides waveforms produced in the FIG. 1 circuit and illustrating mode of operation, FIGS. 3, 4, and 5 are drawings of parts of FIG. 1 shown in more detail, and FIG. 6 illustrates a modification to the FIG. 1 circuit to provide alternative comparator latching arrangements.

Referring to FIG. 1, an avalanche photodiode quenching circuit 20 of the invention is illustrated in schematic form. The circuit 20 incorporates an avalanche photodiode (APD) 22 connected between a $-257$ V dc supply 24 and a first circuit node N1, circuit nodes such as N1 being defined to facilitate circuit analysis. The node N1 is connected to an earth 26 via two diodes D1 and D2 in series, and to the non-inverting ($+$) inputs of two comparators C1 and C2 via respective diodes D3 and D4. When the circuit 20 is quiescent, N1 is at $-0.9$ V. A $+5$ V supply 28 is connected to the common point of diodes D1 and D2 by an 820 ohm resistor 30, and to node N1 by a 1 Kohm resistor 31. The resistor 31 is a ballast resistor for APD bias and recharge purposes. The diodes D1 to D4 are very high speed Schottky barrier devices with a potential drop of 0.45 V under forward bias. They are manufactured by Hewlett Packard Inc., an American corporation, as type no 50822800. The comparators C1 and C2 are high-gain amplifiers optimised for comparison applications. They are also very high speed switching devices (propagation delay $\sim 2.2$ nanoseconds), type no SP9685CM manufactured by Plessey Semiconductors Ltd, a British company. They accept analogue voltage inputs and provide an output voltage level of $-1.9$ V or $-0.9$ V according to whether their non-inverting input signal is below or above the corresponding inverting ($-$) input signal. These output voltage levels are standard in emitter coupled logic (ECL). The comparators C1 and C2 have connections 1 to 10 indicating circuit pin numbers. These will be employed to facilitate description, e.g. $C1_x$ will refer to pin x of C1 ($x = 1 \ldots 10$).

The non-inverting ($+$) input $C1_2$ of the first comparator C1 and the common point of diodes D1 and D2 are defined as circuit nodes N2 and N3 respectively. When the circuit 20 is quiescent diode D3 is forward biased. It drops 0.45 V to set N2 at $-1.35$ V. Diode D2 is however reverse biased, since the voltage at N3 is $+0.45$ V set by the voltage drop across forward biased diode D1, which is above N1 ($-0.9$ V). The inverting inputs $C1_3$ and $C2_3$ of the comparators C1 and C2 are connected to respective reference voltage levels VR1 ($-1.38$ V) and VR2 ($-1.5$ V). VR1 and VR2 are therefore 30 mV and 150 mV respectively below the voltage of $-1.35$ V (0.45 V below N1) appearing at the cathodes of diodes D3 and D4 and inputs $C1_2$ and $C2_2$ connected thereto.

The non-inverting inputs $C1_2$ and $C2_2$ of the comparators C1 and C2 are connected to a $-5$ V supply 32 via 1.2 Kohm resistors 34 and 36 respectively. The first comparator C1 has inverting and non-inverting outputs $C1_8$ and $C1_7$ connected to a quench circuit 38, which is in turn connected to an output circuit 41 having an output terminal 42. The quench circuit 38 is activatable by the first comparator C1 to switch node N3 to a voltage of about $-9$ V, and has a switching time of about 1 nanosecond. The circuits 38 and 41 will be described in more detail later.

The second comparator C2 has non-inverting and inverting outputs $C2_7$ and $C2_8$ connected to the supply 32 via 330 ohm and 390 ohm resistors 44 and 46 respectively. A diode D5 is connected between second comparator output $C2_8$ and resistor 34. The non-inverting second comparator output $C2_7$ is also connected to a negative-edge triggered monostable dead-time circuit 48, type no MC 10198 manufactured by Motrola Inc, an American corporation (to be described later in more detail). The circuit 48 has an output defined as circuit node N4 and connected to a latch enable/disable input $C1_4$ of the first comparator C1. It responds to a transient negative-going input pulse by switching rapidly between −0.9 V (high) and −1.9 V (low) ECL logic levels.

The second comparator C2 has a latch enable/disable input $C2_4$ biased at −0.75 V ($\approx$ −0.9 V) by connection to the common point of a series arrangement of a forward biased diode 50 and 1.2 Kohm resistor 52 connected between earth and the −5 V supply 32. This bias condition provides for the second comparator outputs $C2_7$ and $C2_8$ to be in an unlatched (enabled) state, i.e. to be continuously responsive to the difference between the signals at the corresponding inputs $C2_2$ and $C2_3$. The first comparator C1 is in a latched or unlatched output state according respectively to whether the dead-time circuit output signal is −1.9 V or −0.9 V. When the latch input signal at $C1_4$ changes from −0.9 V to −1.9 V, the comparator C1 responds to driving its output signals at $C1_7$ and $C1_8$ to respective levels appropriate to the comparator input signals at the instant of change. In consequence, the comparator output responds to input signals received up to a latching signal; its output may therefore change for up to about 2 nanoseconds after receipt of a latch enable input signal, this interval being the comparator response time.

Referring now also to FIG. 2, voltages at various points in the circuit 20 are shown plotted as a function of time to illustrate timing of circuit operation. The points are N1, $C1_8$, $C2_7$, N4, N2 and N3. FIG. 2 is an idealised drawing intended to be indicative only and voltages are not to scale. The time (abscissa) axis is intended to be linear, but times given are approximate because of measurement difficulties for intervals of the order of nanoseconds.

The mode of operation of the circuit 20 will now be described with reference to FIGS. 1 and 2. Individual voltage levels and time instants to be given are nominal, because they will vary due to component manufacturing tolerances. The circuit 20 is initially in a quiescent state with node N1 at a potential of −0.9 V. This arises from the potential divider formed by the combination of resistor 31 connected in series with the parallel arrangement of diode D3/resistor 34 and diode D4/resistor 36. The combination is connected between +5 V at 28 and −5 V at 32, and diodes D3 and D4 each drop approximately 0.45 V. Node N3 is at +0.45 V by virtue of forward biased diode D1. Since N1 is at −0.9 V as has been said, diode D2 is reversed biased. The APD experiences the potential difference between N1 and the supply 24; i.e. it experiences a reverse bias of 256.1 V, which is 6 V in excess of the voltage $V_{BR}$ required to cause breakdown in response to photon absorption. The non-inverting comparator inputs $C1_2$ and $C2_2$ are both 0.45 V below the N1 voltage (−0.9 V) since diodes D3 and D4 are forward biased; i.e. these inputs are at −1.35 V, above both VR1 (−1.38 V) and VR2 (−1.5 V). The second comparator inverting output $C2_8$ is at ECL logic low of −1.9 V. Consequently, since N2 is at −1.35 V, diode D5 experiences a reverse bias of 0.55 V. The dead-time circuit output N4 is at an ECL logic high of −0.9 V, which provides for the first comparator C1 to be in an unlatched or enabled output state.

The foregoing quiescent conditions correspond to times before $t_1$ in FIG. 2. These conditions begin to change in response to absorption of a photon by the APD 22. Photon absorption initiates a current avalanche in the APD 22, which begins to draw current from the +5 V supply 28 via the 1 Kohm resistor 31. The maximum reverse current through a typical APD is in the region of 50 μAmp, and consequently the voltage at N1 may fall by up to 50 mV due to additional current flowing in the 1 Kohm resistor 31. When at time $t_1$ in FIG. 2 the voltage at N1 has fallen by 30 mV, that at N2 has fallen by a like amount and has become equal to VR1 (−1.38 V). Subsequently, the voltages at N1 and N2 continue to fall together, and that at N2 passes below VR1 changing the sign of the difference signal between the first comparator inputs $C1_2$ and $C1_3$. The first comparator outputs $C1_7$ and $C1_8$ consequently change state at $t_2$ after a propagation delay of about 2 nanoseconds ($t_2-t_1$). Of these, only the signal at $C1_8$ is shown in FIG. 2, since that at $C1_7$ is merely the inverse. The time $t_2$ marks the beginning of the transition at $C1_8$. The transition takes a finite time to complete; it is convenient to indicate its initiation, and a similar convention is employed for later transitions. The change of output state at $t_2$ triggers the quench circuit 38 to switch, which takes node N3 down to a voltage towards that of the −15 V supply 40. The voltage at N3 begins to fall at $t_3$, about 1 nanosecond after $t_2$. This forwards biases diode D2, and eventually reduces the voltage at N1 by in the region of 7 V. Since the APD 22 at quiescence was biased only 6 V above breakdown, reduction in the N1 voltage by 7 V takes it below breakdown and quenches the current avalanche as will be described later.

The initiation of the voltage fall at N3 reduces the voltage at N1 beyond the reduction caused by the APD current avalanche. In consequence the voltage at N2 falls further, and passes below VR2 (−1.5 V) at $t_4$, about 1.5 nanoseconds after $t_3$. It is emphasized that the voltages at N1 and N2 must fall from their quiescent levels by more than 150 mV to take N2 below VR2, whereas a current avalanche in the APD 22 can produce a reduction of up to 50 mV only. Accordingly, when the voltage at N2 falls below VR2 at $t_4$, it is in response to the initiation of the operation of the quench circuit 38. The initiation occurs much earlier than completion of the quench operation, which requires the N1 voltage to fall more than 6 V.

When the N2 voltage falls below VR2 at $t_4$, so also does the voltage at the non-inverting input $C2_2$ of the second comparator C2. This is because the two comparators C1 and C2 have like input circuits. In consequence, the second comparator outputs $C2_7$ and $C2_8$ change ECL logic states at $t_5$, about 2 nanoseconds after $t_4$. The anode voltage of diode D5 therefore rises from −1.9 V to −0.9 V, and this diode becomes forward biased driving up the voltage at N2 connected to its cathode. The N2 voltage consequently rises, and passes VR1 at $t_6$. At $t_7$, 2.5 nanoseconds after $t_5$, the dead-time circuit 48 responds to the negative edge voltage change at $C2_7$ by driving N4 down to −1.9 V (ECL logic low). This latches the first comparator outputs $C1_7$ and $C1_8$ at levels corresponding to the comparator input at the time of latching, i.e. the N2>VR1 condition. The first comparator is accordingly disabled and unresponsive to any subsequent change in the N2 voltage until enabled later.

The latched output state of the first comparator C1 becomes operative at $t_8$, 2 nanoseconds after $t_6$. Since as has been said this corresponds to N2>VR1, the signal to the quench circuit 38 is low and the quench supply voltage 40 is isolated from N3. This terminates quenching of the APD 22 at $t_9$, and the voltages at N1 and N3 begin to rise in response to recharging of the APD 22 via the 1 Kohm bias resistor 31.

Eventually, at time $t_{10}$, APD recharge increases the voltage at N1 above VR2+VD4, where VD4 is the forward bias voltage (0.45 V) across diode D4. This changes the sign of the voltage across the inputs C2$_2$ and C2$_3$ of the second comparator C2, whose outputs C2$_7$ and C2$_8$ change state in response two nanoseconds later at time $t_{11}$. This allows diode D5 to return to reverse bias and the voltage at N2 to return to 0.45 V below that at N1, which has reached the APD recharged or original quiescent level of −0.9 V. At time $t_{12}$ ($t_{12} - t_{11} = 2.5$ nanoseconds), the internal time constant of the monostable dead-time circuit 48 elapses; this is preset to 14 nanoseconds, and is equal to $t_{12} - t_7$. In consequence, the circuit 48 returns N4 to ECL logic high re-enabling the first comparator C1 and returning the circuit 20 to its initial quiescent state.

The output signal from the circuit 20 is monitored at 42, where the output circuit 41 provides matching to a 50 ohm load. The signal indicating detection of a photon by the APD 22 is a pulse a few nanoseconds in width corresponding to the delay between quench and reset.

Referring now to FIGS. 3, 4 and 5, in which parts previously mentioned are like-referenced, the quench circuit 38, the output circuit 41 and the dead-time circuit 48 are shown in more detail. The quench circuit 38 incorporates two fast switching npn transistors 60a and 60b type BFY90 (industry standard designation) arranged in a long-tailed pair differential amplifier configuration. The transistors 60a and 60b have base terminals 62a and 62b connected via 10 V zener diodes 64a and 64b to the first comparator's inverting and non-inverting outputs C1$_8$ and C1$_7$ (not shown) respectively. Transistor 60a has a collector connection to node N3 of FIG. 1, whereas transistor 60b has a collector terminal 66 in series with a 270 ohm load resistor 68 connected to earth. The transistors have respective 330 ohm base bias resistors 70a and 70b and share a common 82 ohm emitter resistor 72 all connected to the −15 V supply 40.

The output circuit 41 incorporates a fast switching npn output transistor 80 type BFY 90 having a base terminal 82 connected to the collector terminal 66 of the quench circuit 38. The base terminal 82 is connected to the −5 V supply 32 via a 180 ohm bias resistor 84 and a diode 86 type IN4149 arranged in series. The transistor 80 has a 10 Kohm collector resistor 88 and a 47 ohm emitter resistor 90, these being connected to +5 V and −5 V supplies 28 and 32 respectively. The output terminal 42 of the circuit 41 is connected to the collector connection 92 of the transistor 80. The output signal at 42 is matched to a 50 ohm load as indicated at 94.

The quench and output circuits 38 and 41 operate as follows. The zener diodes 64a and 64b connect the outputs of the first comparator C1 to the quench circuit base terminals 62a and 62b. They introduce zener voltage offsets of 10 V between these points. These diodes however have very low dynamic impedances for coupling pulses to the base terminals 62a and 62b. When comparator C1 changes output states in response to initiation of an APD avalanche, transistor bases 62a and 62b are pulsed high and low respectively. This switches transistor 60a on and transistor 60b off. Current is drawn from +5 V supply 28 through the series arrangement of resistor 31, diode D2, transistor 60a and emitter resistor 72 to −15 V supply 40. The voltage at node N3 consequently falls. In practice, the fall is arrested by termination of quench, which occurs in response to change in the first comparator output state. In the circuit 38 illustrated, N3 in fact falls by at least 8 V. In consequence, N1 in FIG. 1 will be reduced by at least 6 V as required to quench the APD avalanche.

When transistor base 62b is pulsed low, its corresponding collector terminal goes high to near earth potential. This switches on the output transistor 80 producing a low voltage level at the output terminal 42. The collective response of the quench and output circuits 38 and 41 to an APD avalanche is therefore the production of a negative going pulse at the output terminal 42.

The dead-time circuit 48 is illustrated in FIG. 5. It incorporates a monostable circuit type MC10198 manufactured by Motorola Inc., an American company as has been said. It employs 0 V and −5 V power supplies and operates between ECL logic levels. The circuit will not be described in detail, since it is a standard configuration and component types and values are illustrated. The monostable circuit pulse width $\Delta t$ is a function of the values of a capacitor 100 and a variable resistor 102 (0 to 5 Kohm). The pulse width $\Delta t$ corresponds to the interval $t_{12} - t_7$ in FIG. 2. From the manufacturer's data sheet $$\Delta t = 1.19 C (R + 284) \text{ seconds}$$

where
C = value of capacitor 100 (Farads)
R = value of resistor 102 (ohms)
with C = 10 pF as illustrated, $\Delta t$ or $t_{12} - t_7$ is variable from 3.4 nanoseconds to 63 nanoseconds for R in the range 0 to 5 Kohms. The N4 waveform in FIG. 2 corresponds to $\Delta t = 14$ nanoseconds. The total dead-time of the circuit 20 is $\Delta t$ added to $t_7 - t_1$ and the time before $t_1$ during which N1 falls to VR1+0.45 after photon absorption. The total dead-time is approximately 24 nanoseconds. The circuit 20 is therefore capable of detecting more than $4 \times 10^7$ photons per second, a detection rate better than 40 MHz.

The dead-time of the circuit 20 is only a little more than the fundamental limits set by the physical properties of the APD 22, in terms of response to quenching and speed of recovery and recharging. The photon-induced avalanche is detected very shortly after initiation, and the rest operation is implemented only when operation of the quench circuit is detected by the second comparator C2. In consequence, and despite the very high speed of the circuit 20, reset necessarily occurs subsequent to quench. Furthermore, the first comparator C1 is latched after reset, and is therefore reliably desensitised until the end of the monostable circuit time constant $\Delta t$. This provides a reliable dead-time during which unwanted pulses cannot be output and enabling accurate computation of dead-time pulse count corrections. If faster photodiodes, transistors and comparators become available, the circuit 20 will automatically operate in a shorter time interval, and the monostable circuit time constant is all that requires adjustment to obtain shorter dead-time and higher detection rate.

Referring now to FIG. 6, there is shown an alternative embodiment 120 of the invention, this being equivalent to that illustrated in FIG. 1 with modified comparator latching arrangements. Parts equivalent to those shown in FIG. 1 are like-referenced with 100 prefixes or asterisk superscripts (e.g. C1*) as appropriate. The circuits 20 and 120 are very similar, and the following description will be directed to their differences.

The circuit 120 differs to that described earlier only in that the dead-time circuit 148 receives input from the first comparator's inverting output $C1_8^*$ instead of that of the second comparator $C2^*$. This has the following effect on circuit operation. The first comparator $C1^*$ is now latched in response to a change of state at its own output, and after the sum of the propagation delay through itself (2 nanoseconds) and the delay introduced by the dead-time circuit 148 (e.g. 14 nanoseconds). In this regard, the relevant change of state is negative-going, since the dead-time circuit is negative edge triggered as described earlier. The first comparator's inverting output $C1_8^*$ produces a negative edge at $t_8$ in FIG. 2; this occurs in response to reset of the node N2, and corresponds to termination of the quench signal supplied to the quench circuit 138 by the first comparator $C1^*$. The output node N4 of the dead-time circuit 148 changes state 2.5 nanoseconds after the negative edge is output from the first comparator $C1^*$ (which indicated this comparator's return to the non-quench state). This provides a latch signal at the first comparator latch input terminal $C1_4^*$. The first comparator $C1^*$ consequently becomes latched in an output state corresponding to node N2 (first-comparator input $C1_2^*$) in a reset or non-quench state.

The reason for the modification shown in FIG. 6 is to avoid the possibility of the first comparator C1 becoming latched in the quench state, which would mean that the APD 122 would not recharge. This possibility could occur in the FIG. 1 embodiment if the diode D5 and resistors 34 and 46 introduced a time constant which was longer than the propagation delay through the dead-time circuit 48. The FIG. 6 device 120 does suffer from the disadvantage that a complete detection cycle is extended by the length of the propagation delay through the first comparator $C1^*$, unless of course the dead-time circuit 148 is adjusted to compensate. A further point is that it is necessary for the first comparator to be latched before the second comparator changes state back to quiescence ($t_{11}$ in FIG. 2). This is easily satisfied in the circuits of FIGS. 1 and 6.

We claim:

1. An avalanche photodiode quenching circuit including an avalanche photodiode (22) rechargeable through a ballast resistor (31), an avalanche detection amplifier (C1) having an input (C1$_2$) connected to receive a signal from the photodiode (22) and arranged to respond to a photodiode avalanche by activating quenching means (38), resetting means (C2, D5, 34, 46) arranged to reset the amplifier (C1) subsequent to avalanche detection, and means for introducing a circuit dead-time (48), characterised in that the resetting means (C2, D5, 34, 46) includes a second amplifier (C2) arranged to respond to photodiode bias voltage reduction caused by initiation of quenching.

2. A circuit according to claim 1 characterised in that the means for introducing a circuit dead-time comprises latching means (48) responsive to the second amplifier (C2) for latching the output response of the avalanche detection amplifier (C1) to input reset.

3. A circuit according to claim 2 characterised in that the latching means comprises a monostable circuit (48) triggerable by change of state in the second amplifier output ($C2_7$).

4. A circuit according to claim 2 characterised in that the latching means comprises a monostable circuit (148) triggerable by change of state in the output ($C1_8^*$) of the avalanche detection amplifier ($C1^*$).

5. A circuit according to claim 2, characterised in that the quenching means includes a differential amplifier (60a, 60b) connected to the avalanche detection amplifier output ($C1_7$, $C1_8$) and operative to reduce avalanche photodiode potential drop in response to activation.

* * * * *